(12) United States Patent
Kawasaki et al.

(10) Patent No.: US 6,869,099 B2
(45) Date of Patent: Mar. 22, 2005

(54) AIR BAG APPARATUS FOR VEHICLE

(75) Inventors: Takuji Kawasaki, Kanagawa-ken (JP);
Takeo Sugiyama, Tokyo (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/276,686
(22) PCT Filed: Nov. 22, 2001
(86) PCT No.: PCT/JP01/10232
§ 371 (c)(1),
(2), (4) Date: Nov. 18, 2002
(87) PCT Pub. No.: WO02/066296
PCT Pub. Date: Aug. 29, 2002

(65) Prior Publication Data
US 2003/0132620 A1 Jul. 17, 2003

(30) Foreign Application Priority Data
Feb. 20, 2001 (JP) .......................... 2001-43139
Feb. 20, 2001 (JP) .......................... 2001-43140

(51) Int. Cl.[7] .......................... B60R 21/22; B60R 21/16
(52) U.S. Cl. .................. 280/730.2; 280/729; 280/743.2
(58) Field of Search ........................ ; 290/730.2, 743.1, 290/743.2, 729; B60R 21/24

(56) References Cited

U.S. PATENT DOCUMENTS

| 6,010,149 | A | | 1/2000 | Riedel et al. | |
|---|---|---|---|---|---|
| 6,056,316 | A | | 5/2000 | Yamaji et al. | |
| 6,158,767 | A | | 12/2000 | Sinnhuber | |
| 6,318,753 | B1 | * | 11/2001 | Valkenburg | ............ 280/730.2 |
| 6,394,487 | B1 | * | 5/2002 | Heudorfer et al. | ........... 280/729 |
| 6,402,291 | B1 | * | 6/2002 | Millman et al. | ............... 347/33 |
| 6,431,590 | B1 | * | 8/2002 | Bakhsh et al. | ........... 280/730.2 |
| 6,530,595 | B2 | * | 3/2003 | Masuda et al. | ........... 280/730.2 |
| 6,616,178 | B1 | * | 9/2003 | Nanbu | ...................... 280/730.2 |
| 6,644,687 | B2 | * | 11/2003 | Saito et al. | ............... 280/730.2 |
| 2001/0022443 | A1 | * | 9/2001 | Masuda | ................... 280/743.1 |

FOREIGN PATENT DOCUMENTS

| GB | 2 324 068 | 10/1998 |
|---|---|---|
| GB | 2 327 066 | 1/1999 |
| JP | 10-315896 | 12/1998 |
| JP | 11-091492 | 4/1999 |
| JP | 2000-052911 | 2/2000 |
| JP | 2000-127886 | 5/2000 |
| JP | 2000-159048 | 6/2000 |
| JP | 2001-114058 | 4/2001 |
| JP | 2001-246999 | 9/2001 |

* cited by examiner

Primary Examiner—Ruth Ilan
(74) Attorney, Agent, or Firm—McDermott Will & Emery LLP

(57) ABSTRACT

An air bag apparatus is capable of inflating an air bag body downwardly and appropriately in spite of the collapse deformation of a center pillar toward a vehicle's interior. The air bag apparatus includes a plurality of inflatable chambers juxtaposed in a fore-and-aft direction of the vehicle. In these chambers, the chamber 3A corresponding to the center pillar 13 is provided, on its upper side, with a hooking part 21 for joining an inside cloth 1a of the chamber 3A to its outside cloth 1b. Owing to the provision of the hooking part 21, since the expansion thickness of the chamber 3A is partially restricted, the air bag body 1 being folded in two has its lower end capable of passing under a lower end of a roof trim 16 with ease and without being caught by an upper part of the center pillar 13, accomplishing the expansion of the air bag body 1 in the form of a curtain.

12 Claims, 7 Drawing Sheets

AIR BAG APPARATUS FOR VEHICLE

TECHNICAL FIELD

The present invention relates to an air bag apparatus for vehicle. Particularly, it relates to an air bag apparatus which allows its air bag body to be inflated from an interior side of an automotive roof-side rail downwardly at the vehicle collision.

BACKGROUND ART

Japanese Patent Publication No. 2000-159048 discloses an automotive air bag apparatus which is provided to prevent an passenger's head etc. from contacting with a sidewall of vehicle cabin at the vehicle collision while absorbing its impact energy. This air bag apparatus is installed on the vehicle's interior side of a roof-side rail so as to extend along the fore-and-aft direction of the vehicle. The apparatus is also adapted so as to inflate its air bag body from an interior side of an automotive roof-side rail downwardly at the vehicle side collision.

The air bag body includes a plurality of chambers separated from each other in the fore-and-aft direction of the vehicle, a duct part in common with the chambers and a plurality of gas induction ports for communicating the duct part with the chambers. Under an inactivated condition of the air bag apparatus, the air bag body is folded and accommodated between the side face (interior side) of the roof-side rail and a roof trim for covering the roof-side rail and a roof panel.

DISCLOSURE OF INVENTION

At the vehicle side collision, an inflator is first energized to generate air-bag gas. Then, the air-bag gas is introduced into the chambers through a tube between the inflator and the air bag body, the duct part and the gas induction ports, in order. Owing to the introduction of air-bag gas, the air bag body expands downwardly like a curtain.

Meanwhile, according to the vehicle side collision, there is a case that a center pillar is deformed toward the vehicle's interior. Then, at the initial stage of the expansion in the air bag body, the lowermost end of the trim corresponding to the center pillar is greatly sprung up while increasing a reaction force of the roof trim. Due to the so-increased reaction force of the roof trim and also an external force applied on the center pillar on deformation, a problem arises in that the air bag body is pinched between the lowermost end of the roof trim and a lower end of an unfolding guide (or an upper end of a garnish), so that the lower part of the air bag body is caught by the lower end of the unfolding guide (or the upper end of the garnish) in the incomplete expansion of the air bag body. Under such a situation, at a position corresponding to the center pillar, the air bag body is folded in two bodies and still stabilized between the lowermost end of the roof trim and the garnish for the center pillar in spite of the incomplete expansion.

Under the above circumstance, it is an object of the present invention to provide an air bag apparatus for vehicle, which can ensure a complete inflation of an air bag body without being pinched by other elements even if the vehicle is subjected to a side collision where a center pillar is collapsed toward the vehicle's interior.

According to the invention, the above-mentioned object is accomplished by an air bag apparatus for vehicle, comprising:

an inflator arranged in a vehicle body to generate air-bag gas at a vehicle collision;

an air bag body connected with the inflator, the air bag body having a plurality of chambers juxtaposed in a fore-and-aft direction of the vehicle, the air bag body being folded and accommodated in a space defined between an interior side face of a roof-side rail forming the vehicle body and a trim for covering the interior side face of the roof-side rail; and a preventive mechanism for preventing the air bag body from being incompletely inflated at a specified chamber of the chambers, the specified chambers being arranged corresponding to a center pillar forming the vehicle body;

whereby, at the vehicle collision, the air bag body can be completely inflated by the air-bag gas, downwardly from the space while springing an lower end of the trim backwardly.

BEST MODE FOR CARRYING OUT THE INVENTION

Embodiments of the present invention will be described below with reference to accompanying drawings.

Figure 1:
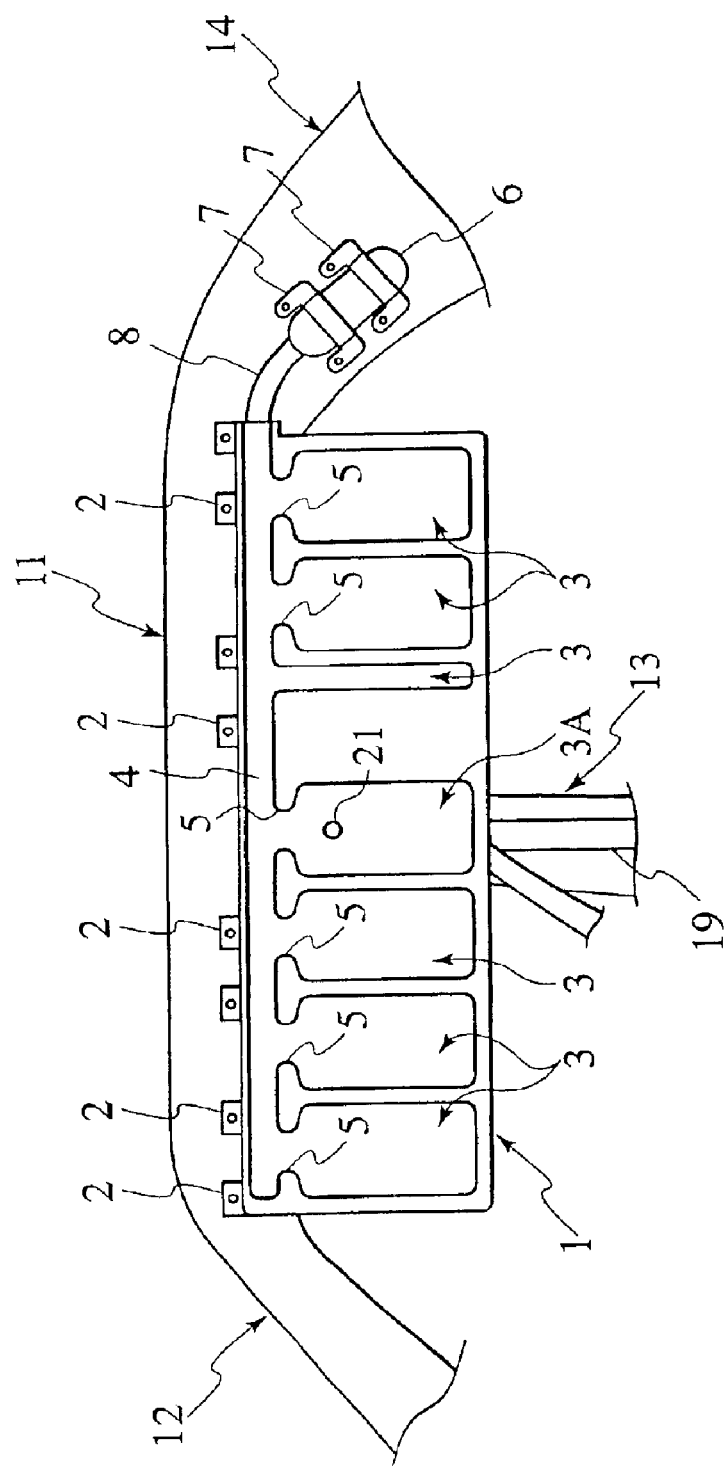
FIG. 1 is a schematic explanatory view showing the arrangement of an air bag apparatus in accordance with the first embodiment of the present invention, also viewed from its vehicle's interior side.

In the drawings, FIG. 1 is a side view of an air bag apparatus of the first embodiment of the invention, also viewed from its vehicle's interior side. In this air bag apparatus, an air bag body 1 is provided, on an upper edge thereof, with a plurality of attachment pieces 2. Through the attachment pieces 2, the air bag body 1 is further fixed on a side face (on the vehicle's interior side) of an automotive roof-side rail 11 by means of bolts/nuts 10 (FIG. 5), along the fore-and-aft direction of the vehicle. As shown in FIG. 1 where the expanded condition of the air bag apparatus is also illustrated, the air bag body 1 includes a plurality of chambers 3 separated from each other in the fore-and-aft direction of the vehicle, an upside duct section 4 in common with the chambers 3 and a plurality of gas induction ports 5 communicating the duct section 4 with the respective chambers 3.

The upside duct section 4 of the air bag body 1 is connected with an inflator 6 through a tube 8. In operation, on receipt of a collision signal from a not-shown collision sensor, this inflator 6 generates a gas for the expansion of the air bag body 1. The inflator 6 is fixed to a rear pillar 14 through brackets 7. Alternatively, the inflator 6 may be fixed to a front pillar 12 in the modification although it is not shown.

Figure 6:
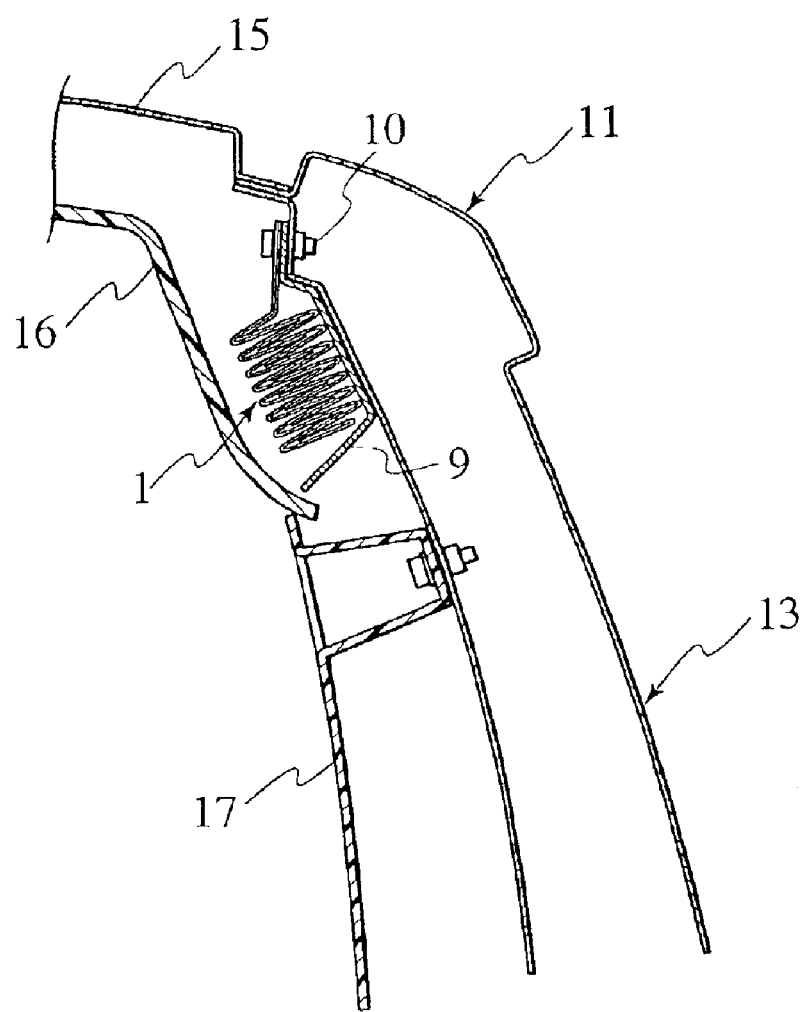
FIG. 6 is a sectional view of a center pillar part of FIG. 1.

In the precondition for use, as shown in FIG. 6, the air bag body 1 is folded and accommodated in a space defined between the vehicle's interior side face of the roof-side rail 11 and a roof trim 16 for covering a roof panel 15 and the vehicle's interior side face of the roof-side rail 11.

When the vehicle has a side collision, the inflator 6 is energized to generate the gas. Then, the generated gas is introduced into the duct section 4 of the air bag body 1 through the tube 8 and subsequently introduced to the respective chambers 3 for expansion through the gas induction ports 8. Owing to the expanding pressure, the chambers 3 are unfolded downwardly in the form of a curtain while springing the lowermost end of the roof trim 16 upwardly. In order to accomplish such a downward expansion of the air bag body 1 appropriately, a plurality of unfolding guides 9 are fastened to the vehicle's interior side face of the roof-side rail 11, together with the attachment pieces 2, in the fore-and-aft direction of the vehicle.

In addition to the provision of the unfolding guides 9, according to the first embodiment, there is specifically selected a chamber 3A corresponding to a center pillar 13, out of the plural chambers 3. Further, the specified chamber 3A is provided with a hooking part 21 (preventive mechanism) which partially joins an inside cloth 1a (FIG. 5) of the air bag body 1 to an outside cloth 1b thereof.

Figure 2:
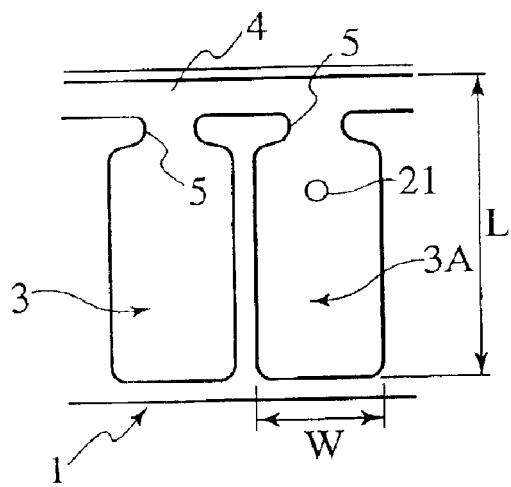
FIG. 2 is a schematic explanatory view showing an essential part of the air bag apparatus of the first embodiment.

As shown in FIGS. 1 and 2, the hooking part 21 of the embodiment is established in a position higher than the substantial vertical center of the unfolded chamber 3A having a height L. Further, in the fore-and-aft direction of the chamber 3A, the hooking part 21 is also positioned at a horizontal center of the chamber 3A having a width W. Note, in the first embodiment shown in FIGS. 1 and 2, the single hooking part 21 is shaped to be circular with a predetermined area.

The hooking part 21 may be formed by stitching up the air bag body 1 (after textile forming) with sutures. Alternatively, the part 21 may be formed simultaneously with the textile forming of the air bag body 1.

Figure 5:
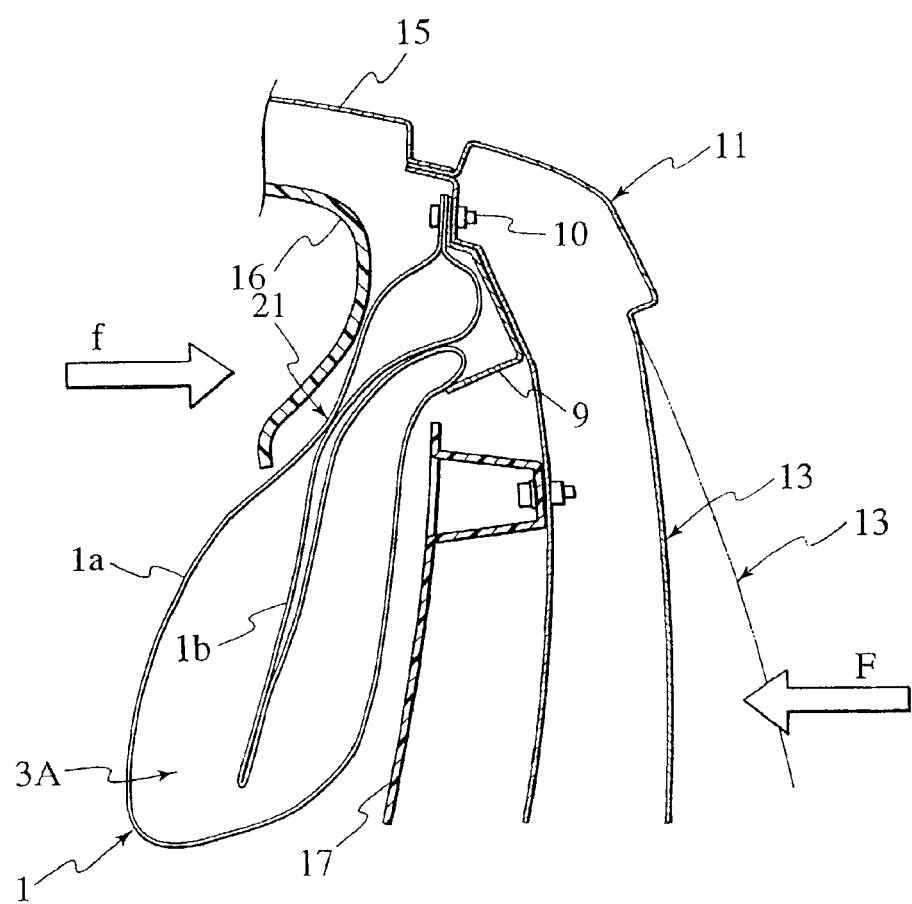
FIG. 5 is a sectional view of the air bag apparatus for explanation of the process of inflating its air bag body in common with the first to the third embodiments, also showing its section at the automotive center pillar.

The operation of the air bag apparatus of this embodiment will be described with reference to FIG. 5.

If the center pillar 13 is deformed toward the vehicle's interior by the vehicle side collision, the chamber 3A is also inflated in an area corresponding to the center pillar 13. As to this inflation of the chamber 3A, there has been the conventional possibility that in the early stage of unfolding operation of the air bag body 1 while being folded in two, the body 1 is pinched between the lowermost end of the roof trim 16 and the lower end of the unfolding guide 9 (or an upper end of a garnish 17), so that the lower part of the air bag body 1 is caught by the lower end of the unfolding guide 9 or the upper end of the garnish 17 to cause the chamber 3A to be still folded in two in its inferior expansion in spite of the final stage of the unfolding operation of the air bag body 1. However, according to the embodiment of the invention, the expansion thickness of the chamber 3A is abruptly reduced at the hooking part 21, as shown in FIG. 5. Consequently, the lower portion of the air bag body 1 being folded in two becomes possible to pass under the chamber's portion with the hooking part 21 easily, whereby the air bag body 1 can be inflated appropriately without being pinched between the lowermost end of the roof trim 16 and the roof-side rail 11 (or the upper part of the center pillar 13).

Note, in the modification, it may be established that the hooking part 21 is broken when an inner pressure in the chamber 3A reaches a normal inflating pressure, thereby accomplishing the normal expansion thickness of the chamber 3A due to the curtain-shaped unfolding of the air bag body 1.

Figure 3:
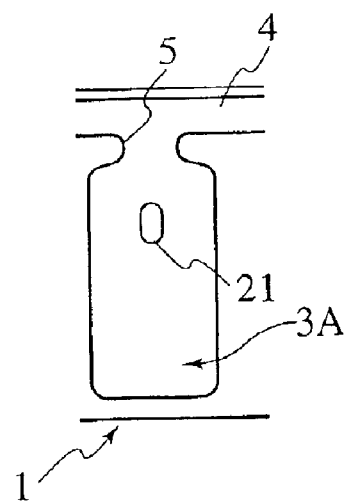
FIG. 3 is a schematic explanatory view showing an essential part of the air bag apparatus in accordance with the second embodiment of the invention.

FIG. 3 shows the second embodiment of the present invention. Note, in the following embodiments including the second embodiment, elements similar to those of the first embodiment are indicated with the same reference numerals respectively.

In the second embodiment, the hooking part 21 on the chamber 3A is elongated longitudinally in comparison with the hooking part 21 of the first embodiment. Owing to the formation of the above hooking part 21, it is possible to increase the chamber's portion (3A) whose expansion thickness is reduced by the hooking part 21 in the vertical direction, in comparison with the first embodiment. Therefore, even if the air bag body 1 is folded in two at the beginning of inflating, the downward-slipping of the lower part of the air bag body 1 between the roof trim 16 and the garnish 17 can be facilitated furthermore. Particularly, the embodiment would be effected in case of the chamber 3A having a large length (in the vertical direction).

Alternatively, the hooking part 21 may be modified to be long sideways in the horizontal direction of the chamber 3A, which is not shown in the figure. Then, the chamber's portion (3A) whose expansion thickness is reduced by the hooking part 21 is increased horizontally. Therefore, the modification would be effected in case of the chamber 3A having a large width, particularly.

Figure 4:
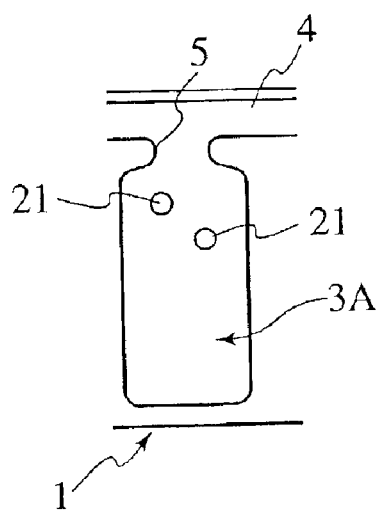
FIG. 4 is a schematic explanatory view showing an essential part of the air bag apparatus in accordance with the third embodiment of the invention.

FIG. 4 shows the third embodiment of the invention. According to this embodiment, the chamber 3A is provided with a plurality of hooking parts, for example, two hooking parts 21 in staggered arrangement.

In the third embodiment, since the chamber's portion (3A) having a reduced expansion thickness is increased vertically and horizontally, even if the air bag body 1 is folded in two at the beginning of inflating, the downward-slipping of the lower part of the air bag body 1 between the roof trim and the garnish can be ensured furthermore. This embodiment would be further effected in case of the chamber 3A having large length and width.

Additionally, owing to the staggered arrangement of the hooking parts 21, 21, it is possible to restrict a reduction of the gas-passage area for the chamber 3A, maintaining the introductory capability of gas into the chamber 3A.

Figure 7:
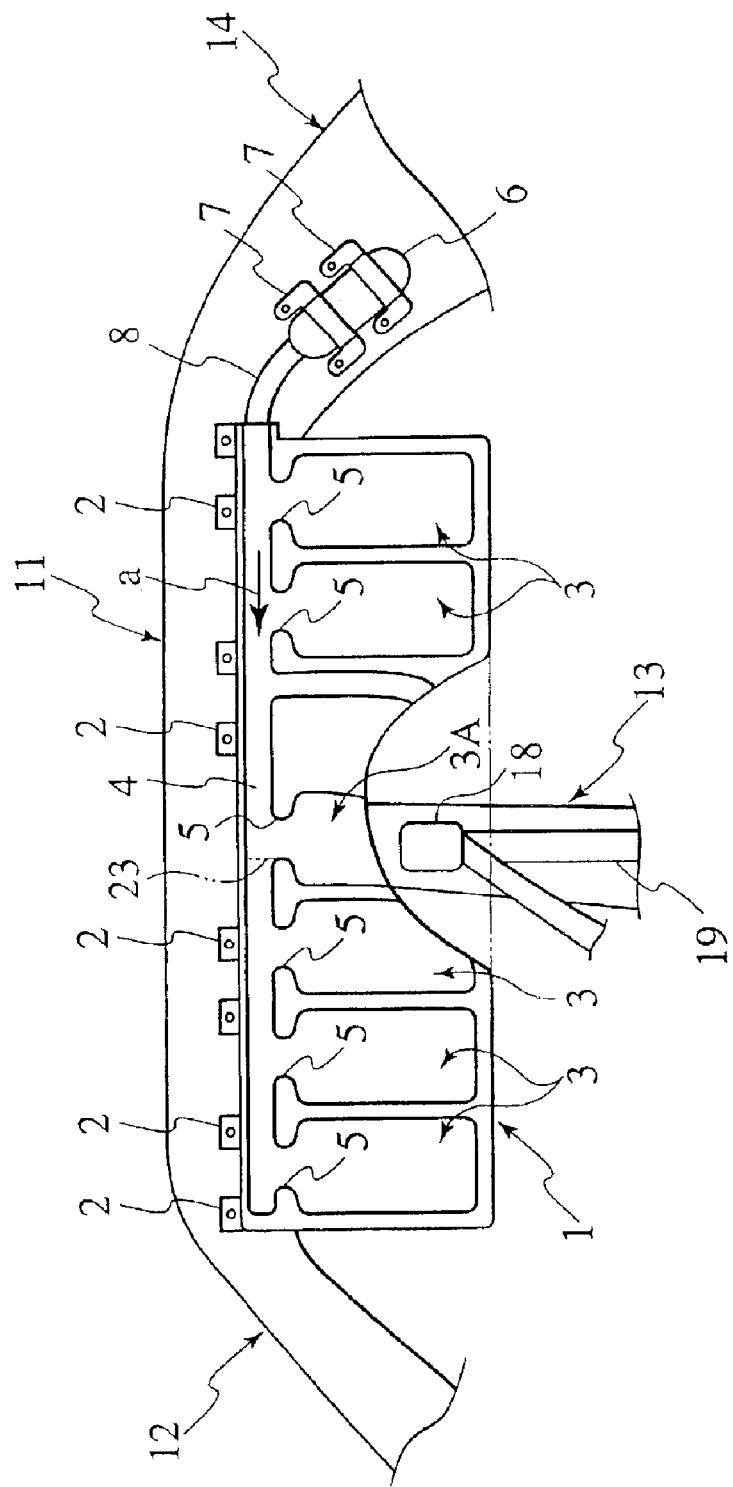
FIG. 7 is a schematic explanatory view showing the arrangement of an air bag apparatus in accordance with the fourth embodiment of the present invention, also viewed from its vehicle's interior side.
Figure 8:
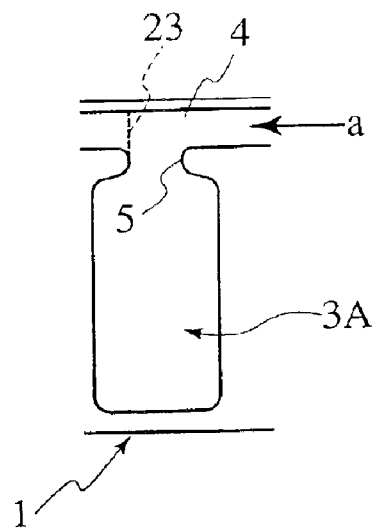
FIG. 8 is a schematic explanatory view showing an essential part of the air bag apparatus of the fourth embodiment.

FIGS. 7 and 8 show the fourth embodiment of the invention, which is different from the above-mentioned embodiments, in terms of the mechanism about the chamber 3A corresponding to the center pillar 19. Also, FIG. 7 is a side view of an air bag apparatus of the fourth embodiment, also viewed from its vehicle's interior side. Note, also in this embodiment, elements similar to those of the first embodiment are indicated with the same reference numerals respectively and their overlapping descriptions are eliminated.

According to this embodiment, the chamber 3A is provided with a seaming part 23 (preventive mechanism) which allows the air-bag gas to be introduced into the chamber 3A while taking precedence over the other chambers 3. The seaming part 23 is adapted so as to be broken when an inside pressure of the chamber 3A reaches a predetermined inside expansion pressure. As to the positioning, the seaming part 23 is arranged in the duct part 4 close to the induction port 5 for the chamber 3A. In detail, the seaming part 23 is positioned, in a flowing direction (arrow a) of the air-bag gas, on its downstream-side margin of the induction port 5 for the chamber 3A.

In the embodiment of FIGS. 7 and 8, the seaming part 23 is shaped so as to be a perpendicular line to the flowing direction a of the air-bag gas. As similar to the hooking part 21 of the previous embodiments, the seaming part 23 may be formed by stitching up the air bag body 1 (after textile forming) with sutures. Alternatively, the same part 23 may be formed simultaneously with the textile forming of the air bag body 1.

According to the fourth embodiment of the invention, at the vehicle side collision, the air-bag gas flowing through the duct part 4 is blocked up by the seaming part 23 at the above position and continuously introduced into the chamber 3A while taking precedence over the chambers 3 on the downstream side of the chamber 3A. Consequently, it is possible to inflate the chamber 3A as shown with a broken line of FIG. 7, preventing the air bag body 1 from being caught by the center pillar 13 and folded in two.

As mentioned before, when the inside pressure of the chamber 3A reaches the predetermined inside expansion pressure, then the seaming part 23 is broken to introduce the air-bag gas into the other chambers 3 on the downstream side of the chamber 3A, accomplishing the inflation of the air bag 1 like a curtain.

Hereat, since the seaming part 23 is in the form of a perpendicular line to the flowing direction a of the air-bag gas, it is possible to lower the inside pressure for breakage of the seaming part 23. Therefore, this form of the seaming part 23 would be effective if the inside pressure for expansion of the specified chamber 3A is relatively small.

Figure 9:
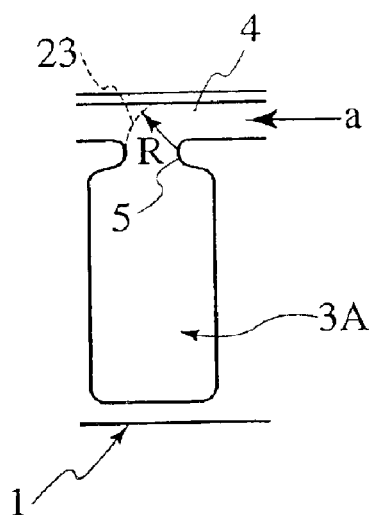
FIG. 9 is a schematic explanatory view showing an essential part of the air bag apparatus in accordance with the fifth embodiment of the invention.

FIG. 9 shows the fifth embodiment of the present invention. According to this embodiment, the seaming part 23 in the form of a curved line is arranged, in the flowing direction a of the air-bag gas, on its downstream-side margin of the induction port 5 for the chamber 3A. The curved line of the seaming part 23 describes an arc with a predetermined radius R to the flowing direction a of the air-bag gas.

Owing to the configuration of the seaming part 23, it is possible to disperse a stress inside the duct part 4. Additionally, since the seaming part 23 of this embodiment is formed with a length larger than that of the same part of the previous embodiment, the formation allows the seaming part 23 to endure the air-bag gas of a high pressure. From these reasons, this form of the seaming part 23 would be effective if the inside pressure for expansion of the specified chamber 3A is relatively high.

Figure 10:
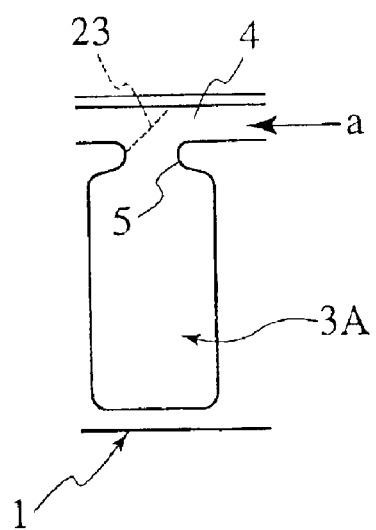
FIG. 10 is a schematic explanatory view showing an essential part of the air bag apparatus in accordance with the sixth embodiment of the invention.

FIG. 10 shows the sixth embodiment of the present invention. According to this embodiment, the seaming part 23 in the form of a slanted line is arranged, in the flowing direction a of the air-bag gas, on its downstream-side margin of the induction port 5 for the chamber 3A. In detail, the seaming part 23 is slanted to the flowing direction a of the air-bag gas.

Owing to the inclination of the seaming part 23, since the seaming part 23 of this embodiment is also formed with a length larger than that of the same part of FIG. 8, the formation allows the seaming part 23 to endure the air-bag gas of a high pressure. Therefore, this form of the seaming part 23 would be effective if the inside pressure for expansion of the specified chamber 3A is relatively high. Additionally, by altering an inclination angle of the seaming part 23, then it is possible to adjust the pressure for breakage of the seaming part 23 with ease.

Note, although the above-mentioned seaming parts 23 of FIGS. 8 to 10 are respectively directed to introduce the gas into the specified chamber 3A positively, these embodiments may be modified so as to introduce the gas into the chambers 3 on both sides of the specified chamber 3A positively, thereby preventing the chamber 3A from being folded in two.

Figure 11:
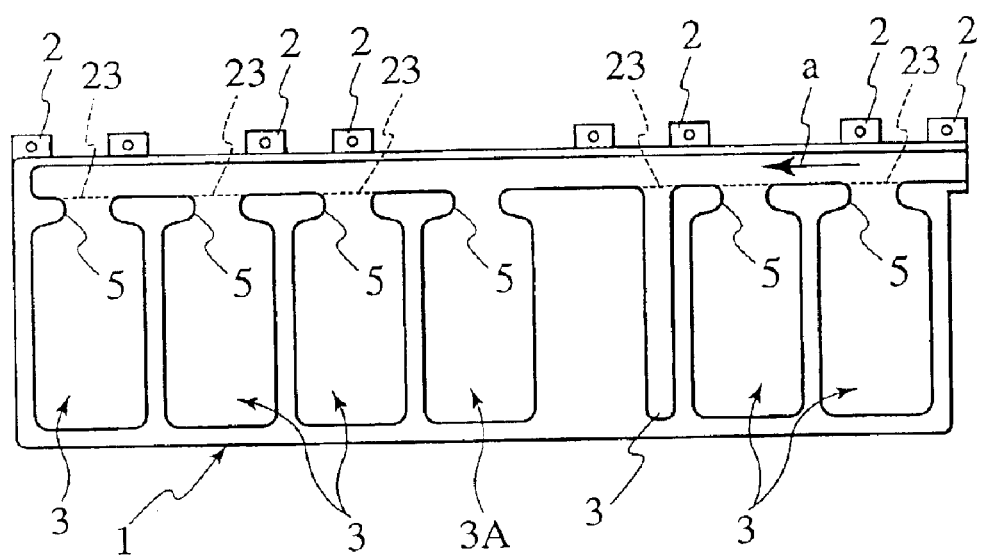
FIG. 11 is a schematic explanatory view showing an essential part of the air bag apparatus in accordance with the seventh embodiment of the invention.

FIG. 11 shows the seventh embodiment of the present invention. In this embodiment, the chambers 3 except the specified chamber 3A are provided with the seaming parts 23 which block up the gas induction ports 5. Therefore, according to the embodiment, it is possible to introduce the air-bag gas into the specified chamber 3A while taking precedence over the other chambers 3 with the seaming parts 23, easily.

Finally, it will be understood by those skilled in the art that the foregoing descriptions are nothing but some embodiments of the disclosed air bag apparatus. Besides these embodiments, various changes and modifications may be made to the present invention without departing from the spirit and scope of the invention.

Japanese Patent Application No. 2001-43139 is incorporated herein by reference in its entirety.

The scope of the invention is defined with reference to the following claims.

What is claimed is:

1. An air bag apparatus for a vehicle, comprising:
    an inflator arranged in a vehicle body to generate air-bag gas at a vehicle collision;
    an air bag body connected with the inflator, the air bag body having a plurality of chambers juxtaposed in a fore-and-aft direction of the vehicle, the air bag body being folded and accommodated in a space defined between an interior side face of a roof-side rail forming the vehicle body and a trim for covering the interior side face of the roof-side rail; and
    a preventive mechanism for preventing the air bag body from being incompletely inflated at a specified chamber of the chambers the specified chamber being arranged corresponding to a center pillar forming the vehicle body, the preventive mechanism configured to reduce an expansion thickness of the specific chamber in a vicinity of an upper end of a center pillar garnish, the preventive mechanism configured to be broken when an inner pressure in the specific chamber reaches a normal inflating pressure, thereby accomplishing a normal expansion thickness of the specific chamber,
    whereby, at the vehicle collision, the air bag body can be completely inflated by the air-bag gas downwardly from the space while springing an lower end of the trim backwardly.

2. The air bag apparatus as claimed in claim 1, wherein the preventive mechanism comprises a hooking part positioned at a substantial center of the specified chamber in the fore-and-aft direction of the vehicle, joining an inside cloth to an outside cloth which form the specified chamber.

3. The air bag apparatus as claimed in claim 2, wherein the specified chamber's portion forming the hooking part is established to be elongated in an up-and-down direction of the vehicle.

4. The air bag apparatus as claimed in claim 2, wherein the specified chamber's portion forming the hooking part is established to be elongated in the fore-and-aft direction of the vehicle.

5. The air bag apparatus as claimed in claim 1, wherein the preventive mechanism comprises a plurality of hooking parts formed on the specified chamber in staggered arrangement, joining an inside cloth to an outside cloth which form the specified chamber.

6. An air bag apparatus for a vehicle comprising:
an inflator arranged in a vehicle body to generate air-bag gas at a vehicle collision;
an air bag body connected with the inflator, the air bag body having a plurality of chambers juxtaposed in a fore-and-aft direction of the vehicle, the air baa body being folded and accommodated in a space defined between an interior side face of a roof-side rail forming the vehicle body and a trim for covering the interior side face of the roof-side rail; and
a preventive mechanism for preventing the air bag body from being incomnletely inflated at a specified chamber of the chambers, the specified chamber being arranged corresponding to a center pillar forming the, vehicle body,
wherein the preventive mechanism comprises a seaming part arranged in a course of the air-bag gas flowing from the inflator to the chambers, for blocking up the course partially thereby to allow the air-bag gas to be introduced into the specified chamber with priority, the seaming part being capable of breaking open when an inside pressure of the specified chamber reaches a predetermined inside expansion pressure,
whereby, at the vehicle collision, the air baa body can be completely inflated by the air-bag gas downwardly from the space while springing an lower end of the trim backwardly.

7. The air bag apparatus as claimed in claim 6, wherein the course for introducing the air-bag gas of the inflator into the chambers comprises one duct pan in common with the chambers and a plurality of gas induction ports corresponding to the chambers and also communicating the chambers with the duct pan respectively, and the seaming part is arranged, in the flowing direction of the air-bag gas, on its downstream-side margin of the gas induction port corresponding to the specified chamber, thereby to block up the duct part.

8. The air bag apparatus as claimed in claim 7, wherein the seaming part is in the form of a perpendicular line to the flowing direction of the air-bag gas.

9. The air bag apparatus as claimed in claim 7, wherein the seaming part is in the form of a curved line to the flowing direction of the air-bag gas.

10. The air bag apparatus as claimed in claim 7, wherein the seaming pan is in the form of a slanted line to the flowing direction of the air-bag gas.

11. The air bag apparatus as claimed in claim 6, wherein the course for introducing the air-bag gas of the inflator into the chambers comprises one duct part in common with the chambers and a plurality of gas induction ports corresponding to the chambers and also communicating the chambers with the duct part respectively, and the seaming pan is formed so as to block up the gas induction ports for the other chambers besides the gas induction port corresponding to the specified chamber.

12. The air bag apparatus as claimed in claim 1, wherein the preventive mechanism is formed by partially joining an inside cloth and an outside cloth of the air bag body.

* * * * *